(12) United States Patent
Sekishiro

(10) Patent No.: US 9,963,027 B2
(45) Date of Patent: May 8, 2018

(54) WINDSHIELD GLASS PERIPHERAL STRUCTURE

(71) Applicant: TOYOTA JIDOSHA KABUSHIKI KAISHA, Toyota-shi (JP)

(72) Inventor: Masato Sekishiro, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 59 days.

(21) Appl. No.: 15/219,939

(22) Filed: Jul. 26, 2016

(65) Prior Publication Data

US 2017/0028832 A1    Feb. 2, 2017

(30) Foreign Application Priority Data

Jul. 31, 2015    (JP) .................................. 2015-152462

(51) Int. Cl.
| | |
|---|---|
| *B60J 10/70* | (2016.01) |
| *B60J 1/02* | (2006.01) |
| *B60J 1/20* | (2006.01) |
| *B60S 1/04* | (2006.01) |
| *B60J 1/00* | (2006.01) |

(52) U.S. Cl.
CPC ............... *B60J 10/70* (2016.02); *B60J 1/006* (2013.01); *B60J 1/02* (2013.01); *B60J 1/20* (2013.01); *B60S 1/04* (2013.01); *B60S 1/0463* (2013.01)

(58) Field of Classification Search
CPC ....... B60J 1/006; B60J 1/02; B60J 1/20; B60J 10/70; B60S 1/0463; B60S 1/04
USPC .......................................................... 296/93
See application file for complete search history.

(56) References Cited

U.S. PATENT DOCUMENTS

| | | | | |
|---|---|---|---|---|
| 6,814,399 | B2 * | 11/2004 | Johnson ................ | B60S 1/0419 296/192 |
| 8,393,668 | B2 * | 3/2013 | Timmermann .......... | B60J 10/35 296/84.1 |
| 8,864,217 | B2 * | 10/2014 | Schneider ............ | B62D 25/081 296/192 |
| 9,481,397 | B2 * | 11/2016 | D'Andrea ............ | B62D 25/081 |
| 2011/0115261 | A1 | 5/2011 | Platt et al. | |
| 2014/0062037 | A1 | 3/2014 | Platt et al. | |

(Continued)

FOREIGN PATENT DOCUMENTS

| | | |
|---|---|---|
| JP | 3-49175 U | 5/1991 |
| JP | 5614894 | 10/2014 |
| JP | 2015-51653 | 3/2015 |

*Primary Examiner* — Pinel E Romain
(74) *Attorney, Agent, or Firm* — Oblon, McClelland, Maier & Neustadt, L.L.P.

(57) ABSTRACT

A windshield glass peripheral structure is provided including a molding that couples a windshield glass with a cowl louver. The molding includes an attachment portion that is attached to an inner side of an upper end portion of the cowl louver, an interposing portion that is interposed between and seals between a lower end portion of the windshield glass and an upper end portion of the cowl louver, and has a leading end at a vehicle outer side making contact with a lower edge portion of the windshield, glass, and a joining portion. The joining portion extends in a vehicle width direction following, the lower end portion of the windshield glass, is formed with a water drainage portion cut out from a vehicle up-down direction upper end portion of the joining face further toward a vehicle width direction outer side than a wiper unit.

8 Claims, 7 Drawing Sheets

(56) References Cited

U.S. PATENT DOCUMENTS

2016/0176276 A1* 6/2016 Sanada .................... B60J 10/30
                                                     296/96.21
2017/0144709 A1* 5/2017 Nakashima .......... B62D 25/081

* cited by examiner

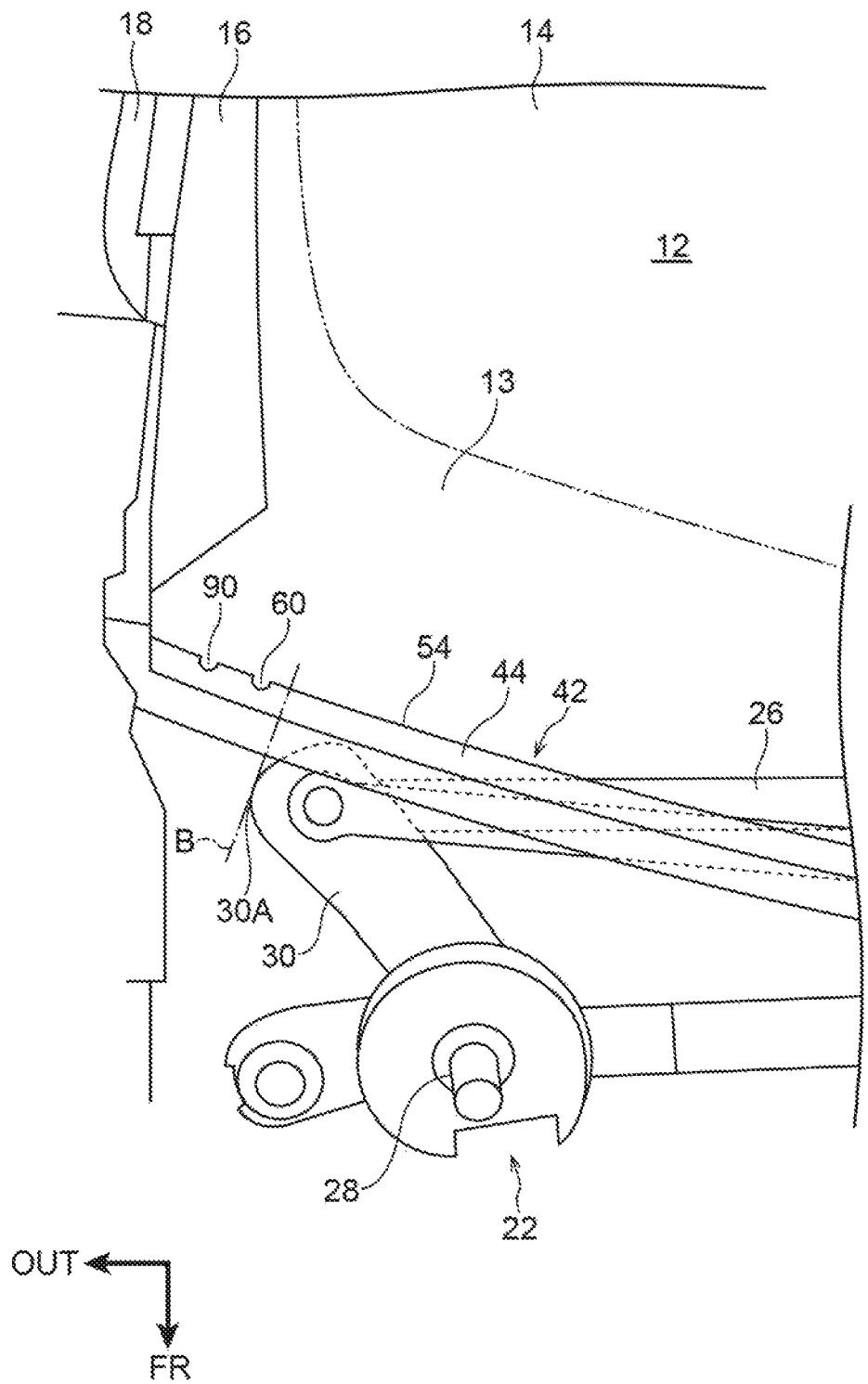

WINDSHIELD GLASS PERIPHERAL STRUCTURE

CROSS-REFERENCE TO RELATED APPLICATION

This application is based on and claims priority under 35 USC 119 from Japanese Patent Application No. 2015-152462 filed on Jul. 31, 2015, the disclosure of which is incorporated by reference herein.

BACKGROUND

Technical Field

The present invention relates to a windshield glass peripheral structure.

Related Art

In vehicles such as automobiles, a windshield glass and a cowl louver positioned at a vehicle from side of the windshield glass are coupled together with a molding interposed therebetween. Japanese Patent Application Laid-Open (JP-A) No. 2015-51653 describes a coupling structure between a windshield glass and a cowl louver that is provided with a molding that includes a fixed portion fixed to an inner face of a lower edge portion of the windshield glass, and a fitting portion that receives an anchor rib that protrudes downward from a location near to an upper edge portion of the cowl louver.

Ordinarily, a molding provided between a windshield glass and a cowl louver is joined to an outer face of the windshield glass. In contrast thereto, in the invention described in JP-A No. 2015-51653, an interposed portion of the molding is interposed between the outer face of the windshield glass and an outer face of the cowl louver; and the outer face of the windshield glass and the outer face of the cowl louver, and a leading end of the interposed portion of the molding, are disposed so as to be flush with each other. In a case of an ordinary molding, when water from a vehicle width direction end portion of the windshield glass enters at the inside of the windshield glass, water droplets run along an inner face of the windshield glass and flow down toward the vehicle up-down direction lower side, falling as they are toward the cowl.

However, in case of the invention described in JP-A No. 2015-51653, the fixed portion of the molding is joined to the inner face of the windshield glass and the molding is curved protruding toward the vehicle front and vehicle bottom. Thus, some of the water droplets that have run along the inner face oldie windshield glass and flowed down toward the vehicle up-down direction, lower side at the vehicle width direction end portion of the windshield glass then run along an upper end portion of the fixed portion of the molding and head toward the vehicle width direction inside. It is therefore possible that the water droplets drip onto part of a wiper unit, such as a wiper link, provided further to the vehicle inside than the cowl louver. There is therefore room for improvement to suppress early deterioration of the wiper unit due to water exposure of the wiper link.

In order to address the problem above, conceivably, for example, a water stopping member such as a dam rubber might be provided to the upper end portion of the molding, to dam water droplets from running along the upper end portion of the molding and beading toward the vehicle width direction inside. However, in such a configuration, providing the water stopping member to the molding as a separate body increases the number of components, thereby increasing the assembly steps and component costs.

In consideration of the above, an object of the present invention is to obtain a windshield glass peripheral structure capable of suppressing water exposure of a wiper unit due to water droplets falling from a molding without adding any new components.

SUMMARY

A windshield glass peripheral structure according to a first aspect includes a molding that couples a windshield glass with a cowl louver provided at a lower end side of the windshield glass. The molding includes an attachment portion that is attached to an inner side of an upper end portion of the cowl louver, an interposing portion that is interposed between and seals between a lower end portion of the windshield glass and an upper end portion of the cowl louver, and has a leading end at a vehicle outer side making contact with a lower edge portion of the windshield glass, and a joining portion that extends in a vehicle width direction following the lower end portion of the windshield glass, that is inclined toward a vehicle front and bottom on progression toward a vehicle width direction central portion, that includes a joining face joined to an inner thee of the lower end portion of the windshield glass, and that is formed with a water drainage portion at which a vehicle up-down direction upper end portion of the joining face is cut out further toward a vehicle width direction outer side than a wiper unit provided at a vehicle up-down direction lower side of the cowl louver.

A windshield glass peripheral structure according to a second aspect is the windshield glass peripheral structure of the first aspect, wherein the water drainage portion is formed such that a water drainage portion lower end is narrower in vehicle width direction width than a water drainage portion upper end.

A windshield glass peripheral structure according to a third aspect is the windshield glass peripheral structure of the second aspect, wherein the water drainage portion includes a gradually changing portion that gradually narrows in vehicle width direction width from the water drainage portion upper end side toward the water drainage portion lower end side, and is formed such that the water drainage portion lower end is narrowest in vehicle width direction width.

A windshield glass peripheral structure according to a fourth aspect is the windshield glass peripheral structure of any one of the first aspect to the third aspect, wherein a parallel portion having a uniform vehicle width direction width is formed at a part of the water drainage portion that is continuous in a depth direction from the water drainage portion upper end.

A windshield glass peripheral structure according to a fifth aspect is the windshield glass peripheral structure of any one of the first aspect to the fourth aspect, wherein the water drainage portion has a curved shape that is convex toward the vehicle up-down direction lower side.

A windshield glass peripheral structure according to a sixth aspect is the windshield glass peripheral structure of any one oldie first aspect to the fifth aspect, wherein at least one other water drainage portion is formed further to the vehicle width direction outer side than the water drainage portion.

In the first aspect, the water droplets from the vehicle width direction end portion of the windshield glass that have headed toward the vehicle width direction inside and run along the upper end portion of the join portion of the molding, fall from the water drainage portion to the vehicle up-down direction lower side. The water drainage portion is provided further to the vehicle width direction outside than the wiper unit, such that water droplets fall further to the vehicle width direction outside than the wiper unit. Deterioration of the wiper unit due to water exposure can thereby be suppressed.

In the second aspect, the water drainage portion makes the water droplets fall more easily the wider the width of the upper end portion of the water drainage portion. However, when the water drainage portion is large, the contact surface area between the windshield glass and the join portion of the molding becomes smaller, decreasing the join strength. By widening the width of the upper end portion and narrowing the width of the lower end portion of the water drainage portion, both the effect of making water droplets fall and securing the join strength of the molding can be achieved.

In the third aspect, the contact surface area between the windshield glass and the molding can be efficiently secured by gradually narrowing the width of the water drainage portion on progression toward the lower end side so as to become narrowest at the lower end portion, while widening the width of the upper end of the water drainage portion to increase the effect of making water droplets fall.

In the fourth aspect, even if the cut is shallow in the processing to form the cut out portion in the join portion of the molding, due to the part of the water drainage portion that is continuous in the height direction from the water drainage portion upper end having a uniform vehicle width direction width, a sufficient width for the water drainage portion can be achieved. The advantageous effect of making water droplets fall can thereby be obtained regardless of variations in the processing to form the water drainage portion.

In the fifth aspect, due to the water drainage portion lower end being a curved shape, the contact surface area with water droplets that have accumulated at the water drainage portion lower end is smaller than in a case in which the water drainage portion lower end is an angular shape. Thus, water droplets more readily separate from the water drainage portion, and water droplets can easily be made to fall.

In the sixth aspect, even in a case in which the how speed of water droplets is fast, the flow speed of the water droplets is decreased by passing the water droplets through a water drainage portion at the vehicle width direction outside, and the water droplets can be made to fall using a water drainage portion at the vehicle width direction inside. Thus, even when applied to a vehicle in which a windshield glass and molding have a large angle of inclination and the flow speed of the water droplets is fast, the water droplets can be made to fall using the water drainage portion, and water exposure of the wiper unit can be suppressed.

The windshield glass peripheral structure according to the first aspect has the excellent advantageous effect of enabling water exposure of the wiper unit to be suppressed by making water droplets fall from the molding.

The windshield glass peripheral structure according to the second aspect has the excellent advantageous effect of enabling both the effect of making water droplets fall using the water drainage portion, and securing the join strength of the molding, to be achieved.

The windshield glass peripheral structure according to the third aspect has the excellent advantageous effect of enabling an efficient shape to be configured in which both the effect of making water droplets fall using the water drainage portion, and securing the join strength of the molding, are achieved.

The windshield, glass peripheral structure according to the fourth aspect excellent advantageous effect of enabling the vehicle width direction width of the water drainage portion to be made uniform regardless of variations in the processing to form the water drainage portion.

The windshield glass peripheral structure according to the fifth aspect enables water droplets to easily be made to fall from the water drainage portion.

The windshield glass peripheral structure according to the sixth aspect enables water exposure of the wiper unit to be suppressed, even in a case in which the flow speed of water droplets is fast.

BRIEF DESCRIPTION OF THE DRAWINGS

Exemplary embodiments of the present invention will be described in detail based on the following figures, wherein:

FIG. 7 is a plan view corresponding to FIG. 1 illustrating the vicinity of a water drainage portion of a molding applied with a windshield glass peripheral structure of a third exemplary embodiment.

DETAILED DESCRIPTION

First Exemplary Embodiment

Explanation follows regarding a first exemplary embodiment of a windshield glass peripheral structure according to the present invention, with reference to FIG. 1 to FIG. 5. Note that in each of the drawings, the arrow FR indicates the vehicle front side, the arrow UP indicates the vehicle upper side, and the arrow OUT indicates the vehicle width direction outside, as appropriate.

Figure 1:
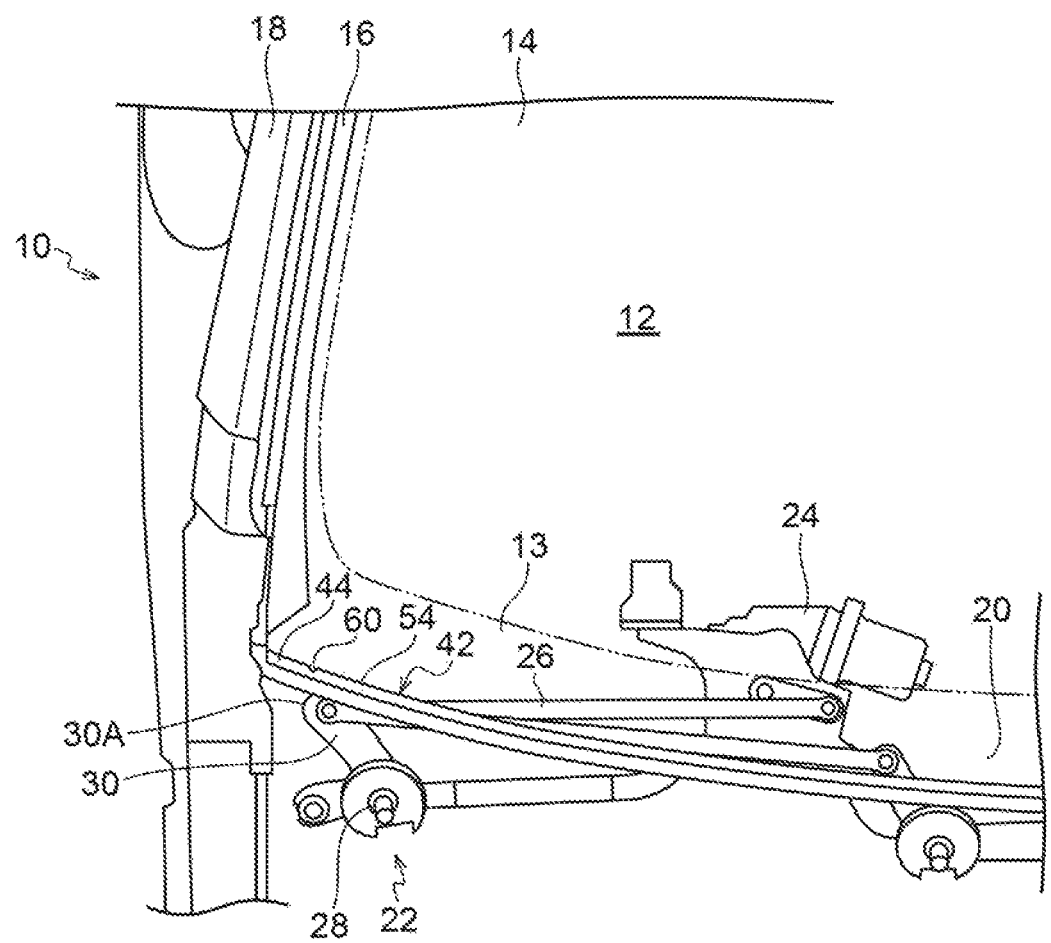
FIG. 1 is a plan view illustrating an overall configuration of a lower portion of a windshield glass at a driving seat side applied with a windshield glass peripheral structure of a first exemplary embodiment.

As illustrated in FIG. 1, a windshield glass 14 is provided to the vehicle front side of a cabin 12 of a vehicle 10. An upper end portion of the windshield glass 14, not illustrated in the drawings, is supported by a roof that extends in a vehicle width direction and a vehicle front-rear direction, and left and right end portions 16 of the windshield glass 14 are supported by a pair of left and right front pillars 18. A lower end portion 20 of the windshield glass 14 is supported by a cowl upper panel, not illustrated in the drawings, and the cowl upper panel is connected to a dash panel through the cowl inner panel. A vehicle width direction central portion of the lower end portion 20 of the windshield glass 14 is curved so as to protrude toward the vehicle front-rear direction front side and a vehicle up-down direction lower side. Note that the upper end portion, the left and right end portions 16, and the lower end portion 20 of the windshield glass 14 are supported by respective members through an adhesive 17 (see FIG. 5). However, configuration is made such that the adhesive 17 is not visible by using a colored portion 13 that is colored using a black ceramic.

A wiper unit 22 is provided at the periphery of the windshield glass 14. The wiper unit 22 is configured including a wiper arm, not illustrated in the drawings, that is disposed outside the vehicle (further to the outside than a hood), a wiper motor 24 that is disposed inside the vehicle (further to the inside than the hood), a wiper link 26 that is disposed inside the vehicle and transmits rotation of the wiper motor 24 to the wiper arm, a wiper pivot 28 that limits a fulcrum of the wiper arm, and a coupling portion 30 that couples the wiper link 26 and the wiper pivot 28 together. When the wiper motor 24 rotates, the wiper link 26 and the coupling portion 30 move left and right to-and-fro, thereby moving the wiper arm. Note that an end portion 30A of the coupling portion 30 that is coupled to the wiper pivot 28 becomes the point of the wiper unit 22 at the vehicle width direction outermost side when the wiper is driven.

Figure 3:
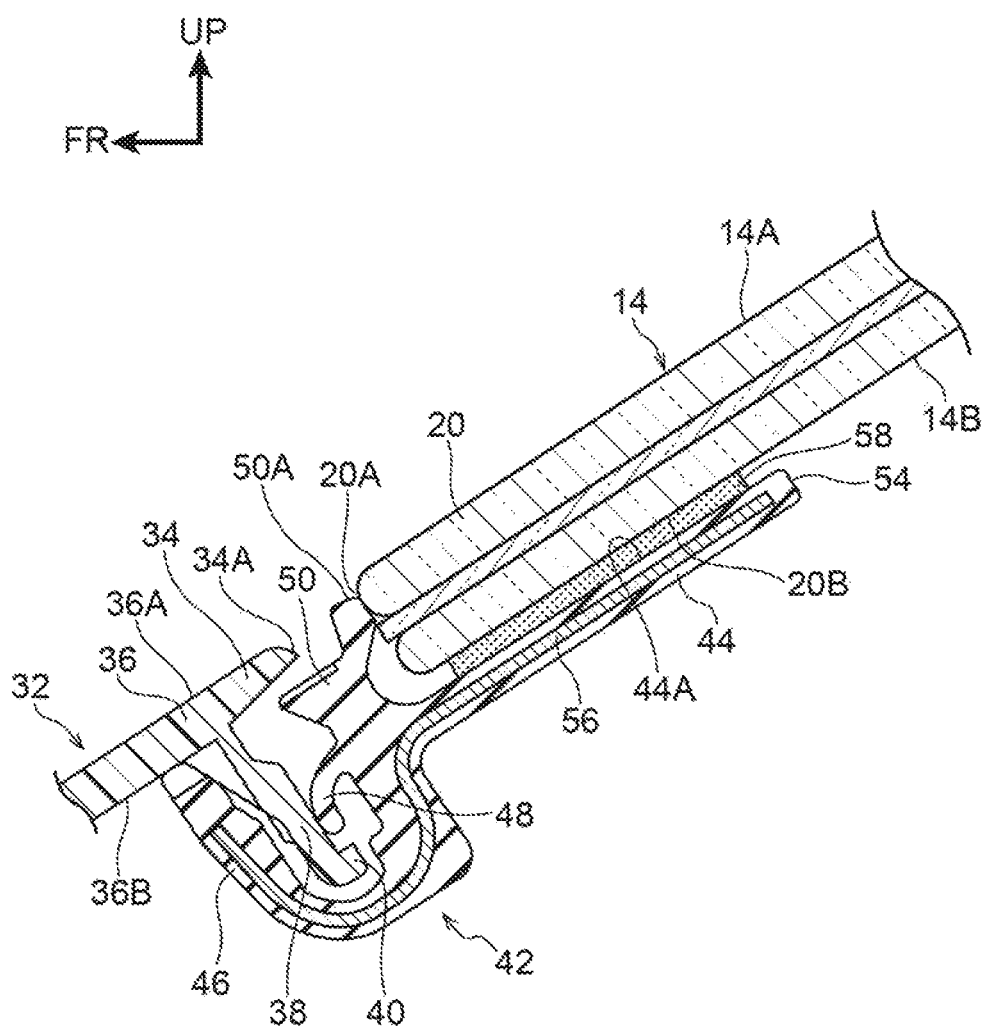
FIG. 3 is a vertical cross-section illustrating the molding taken along line A-A in FIG. 2.

As illustrated in FIG. 3, a cowl louver 32 is provided to a vehicle front-rear direction front side and vehicle up-down direction lower side of the lower end portion 20 of the windshield glass 14. The cowl louver 32 is formed of resin, and an upper end portion 34 of the cowl louver 32 extends in the vehicle width direction following the lower end portion 20 of the windshield glass 14. A main body portion 36 of the cowl louver 32 extends from the lower end portion 20 of the windshield glass 14 toward the vehicle front-rear direction front side and the vehicle up-down direction lower side, and is disposed so as to be substantially parallel with respect to the direction of the plane of windshield glass 14. Namely, an outer face 14A of the windshield glass 14 and an outer face 36A of a main body portion 36 are flush with each other as viewed from the vehicle width direction. An attachment rib 38 is provided projecting out from an inner face 36B of the main body portion 36 toward the vehicle interior. The attachment rib 38 projects out in a direction orthogonal to the direction of the plane of the main body portion 36, and a hook shaped curved portion 40 is provided to leading end of the attachment rib 38. Note that "flush" in the present invention also encompasses cases in which there is a slight step between the outer face 14A of the windshield glass 14 and the outer face 36A of the main body portion 36 of the cowl louver 32.

A molding 42, serving as a member for closing off the gap between the windshield glass 14 and the cowl louver 32, is provided between the windshield glass 14 and the cowl louver 32. The molding 42 is a rubber extrusion-molded component, and an aluminum core member 56 is embedded inside the molding 42. The molding 42 extends in the vehicle width direction following the lower end portion 20 of the windshield glass 14 and the upper end portion 34 of the cowl louver 32. The molding 42 is configured including a join portion 44 that joins an inner face 20B of the lower end portion 20 of the windshield glass 14 to the molding 42, an attachment portion 46 that is attached to the cowl louver 32, and an interposing portion 50 that is interposed between a lower edge portion 20A of the windshield glass 14 and an upper edge portion 34A of the cowl louver 32.

The join portion 44 is a thin sheet shaped portion formed at the vehicle front-rear direction rear side and the vehicle up-down direction upper side of the molding 42, and opposes the lower end portion 20 of the windshield glass 14. The join portion 44 extends in the vehicle width direction, along the lower end portion 20 of the windshield glass 14 and the upper end portion 34 of the cowl louver 32, and a vehicle width direction central portion of the join portion 44 is curved protruding down so as to form a lower end of the join portion 44. A face at the vehicle outside of the join portion 44 configures a join face 44A joined to the inner face 20B of the lower end portion 20 of the windshield glass 14 through a double-sided tape 58.

The attachment portion 46 is formed at the vehicle front-rear direction front side and the vehicle up-down direction lower side of the molding 42, is formed in a U shape in cross-section view as viewed from the vehicle width direction, and is provided opposing the upper end portion 34 of the cowl louver 32. The attachment portion 46 engages with the attachment rib 38 of the cowl louver 32, and a projection 48 that makes contact the attachment rib 38 is provided inside the attachment portion 46. By making contact with the attachment rib 38, the projection 48 suppresses foreign matter from entering into the vehicle interior from between the cowl louver 32 and the molding 42.

As illustrated in FIG. 3, the interposing portion 50 is a projection shape that extends out from the attachment portion 46 toward the vehicle outside. The interposing portion 50 is disposed between the lower edge portion 20A of the windshield glass 14 and the upper edge portion 34A of the cowl louver 32. A projection shaped leading end 50A of the interposing portion 50 is disposed further to the vehicle inside than the outer face 14A of the windshield glass 14 and the outer face 36A of the main body portion 36 of the cowl louver 32, and the leading end 50A makes contact with the lower edge portion 20A of the windshield glass 14. Note that the leading end 50A of the interposing portion 50 does not make contact with the upper edge portion 34A of the cowl louver 32. However, the molding 42 seals between the windshield glass 14 and the cowl louver 32 due to the projection 48 of the molding 42 making contact with the attachment rib 38 of the cowl louver 32 as described above.

Figure 2:
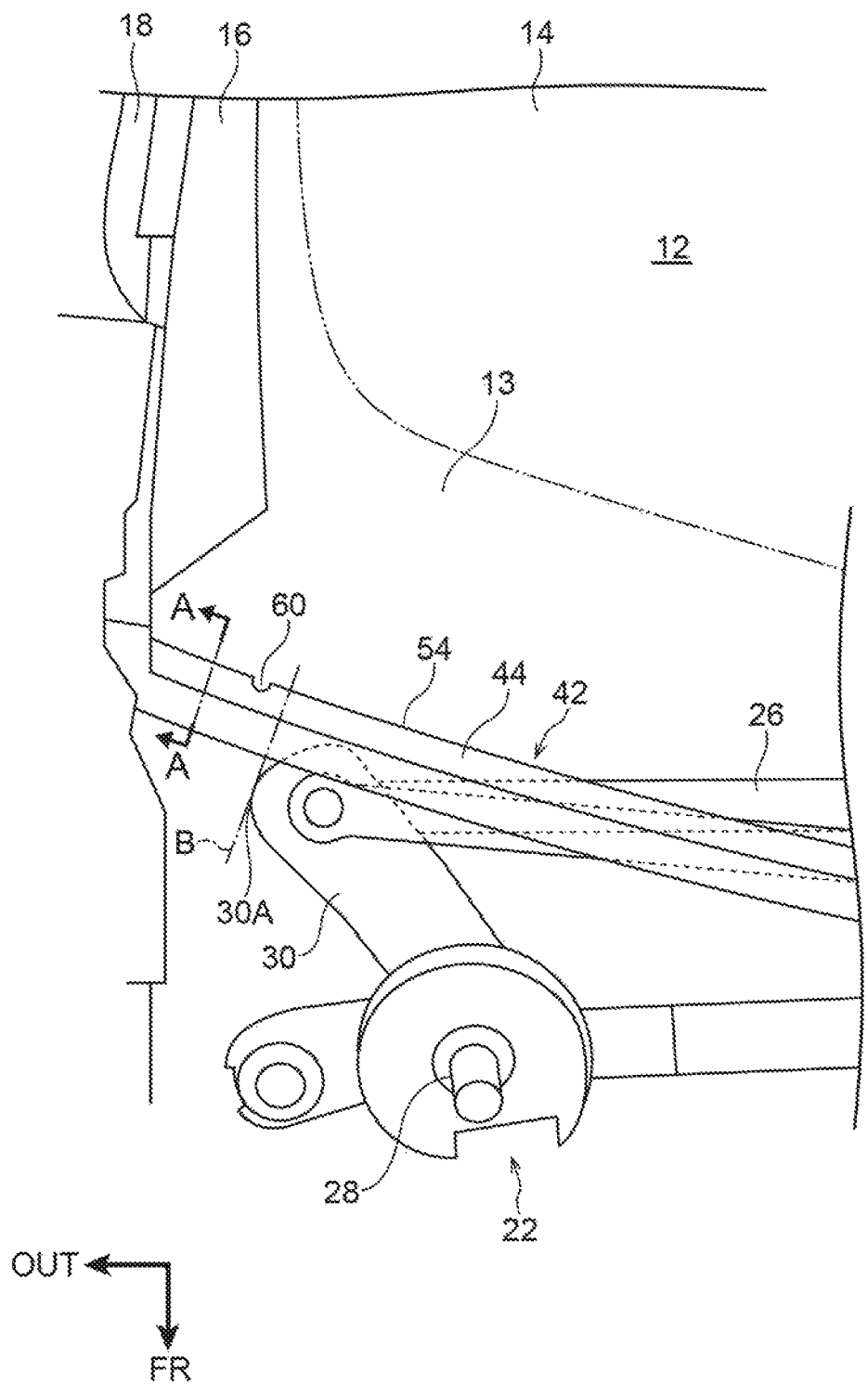
FIG. 2 is an enlarged diagram illustrating the vicinity of a vehicle width direction end portion of the molding in FIG. 1.
Figure 4A:
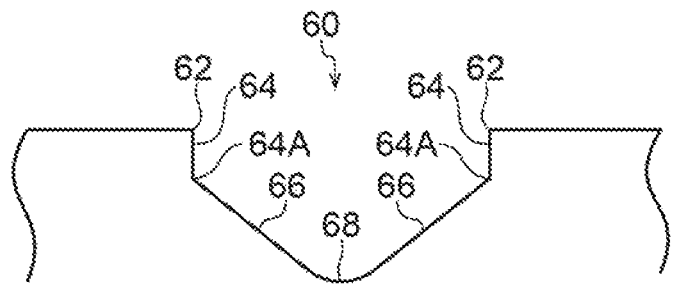
FIG. 4A is a plan view illustrating a water drainage portion of the molding illustrated in FIG. 2.
Figure 4B:
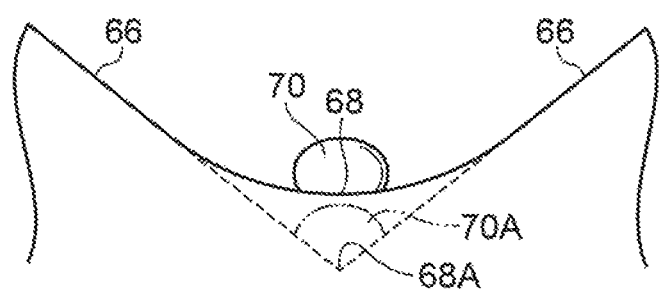
FIG. 4B is an enlarged diagram of a water drainage portion lower end.
Figure 4C:
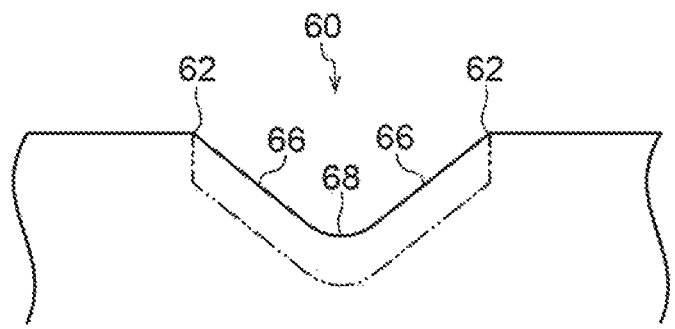
FIG. 4C is a plan view illustrating a water drainage portion in a case in which a shallow cut is made during processing to form the water drainage portion.

As illustrated in FIG. 2, a water drainage portion 60 is formed at an upper end portion 54 of the join portion 44. The water drainage portion 60 is provided further to the vehicle width direction outside than a line segment B orthogonal to the molding 42 and passing through the end portion 30A of the coupling portion 30 forming the vehicle width direction outermost side of the wiper unit 22. The water drainage portion 60 is formed as a cut out from the upper end portion 54 of the join portion 44. As illustrated in FIG. 4A, in the present exemplary embodiment, a parallel portion 64 having uniform vehicle width direction width is formed at a part of the water drainage portion 60 that is continuous from the water drainage portion upper end 62 in a depth direction. A gradually changing portion 66 is formed with a vehicle width direction width that gradually gets smaller from a parallel portion lower end 64A across to a water drainage portion lower end 68. As illustrated in FIG. 4B, the water drainage portion lower end 68 is a curved shape that is convex toward the vehicle up-down direction lower side, and the vehicle width direction width of the water drainage portion 60 is narrowest at the water drainage portion lower end 68. As an example of the present exemplary embodiment, the dimensional ratio of the vehicle width direction width of the water drainage portion upper end 62 to the depth (the vehicle up-down direction length from the water drainage portion upper end 62 to the water drainage portion lower end 68) of the water drainage portion 60 is 2:1, and the dimensional ratio of the depth of the parallel portion 64 (the vehicle up-down direction length from the water drainage portion upper end 62 to the parallel portion lower end 64A) to the depth of the gradually changing portion 66 (the vehicle up-down direction length from the parallel portion lower end 64A to the water drainage portion lower end 68) is 1:2. The vehicle width direction width of the water drainage portion upper end 62 is about 6 mm. Note that the parallel portion 64 need not be strictly and may be substantially parallel.

Explanation follows regarding operation and advantageous effects of the windshield glass peripheral structure of the present exemplary embodiment.

As illustrated in FIG. 3, in the windshield glass peripheral structure of the present exemplary embodiment, the join portion 44 of the molding 42 is joined to the inner face 20B of the lower end portion 20 of the windshield glass 14. Moreover, the water drainage portion 60 is provided at the upper end portion 54 of the join portion 44.

Figure 5:
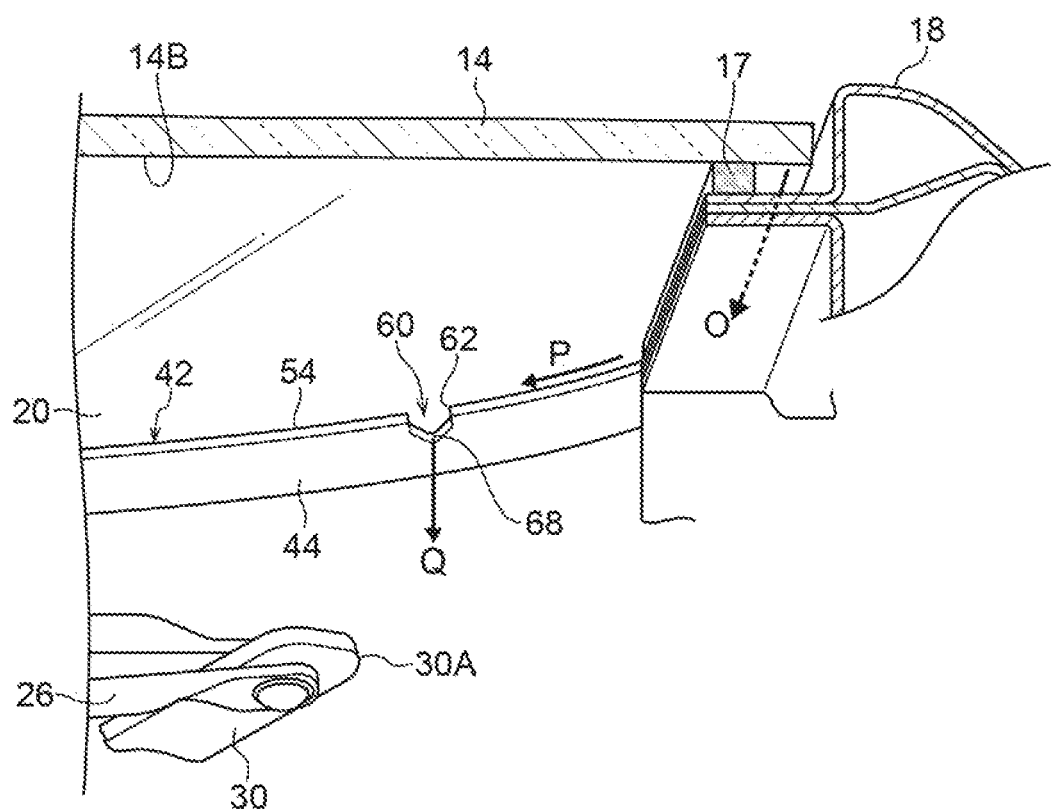
FIG. 5 is a back face view illustrating the flow of a water droplet due to the molding illustrated in FIG. 2.

In the present exemplary embodiment, the flow of a water droplet is explained with reference to FIG. 5. In a case in which water from a vehicle direction end portion of the windshield glass 14 enters into an inner face 14B side of the windshield glass 14, the water droplet runs along the inner face 14B of the windshield glass 14 and flows down (arrow O) from top to bottom. Upon reaching the upper end portion 54 of the join portion 44 of the molding 42, the water droplet then runs along the upper end portion 54 of the join portion 44 ward the vehicle width direction inside (arrow P). Upon reaching the water drainage portion 60, the water droplet decelerated by the water drainage portion upper end 62 falls into the water drainage portion 60 and then falls from the water drainage portion lower end 68 toward the cowl (arrow Q). To explain in detail, the water droplet that has reached the water drainage portion, upper end 62 at the vehicle width direction outside runs along the parallel portion 64, gradually changing portion 66 from the water drainage portion upper end 62 at the vehicle width direction outside and flows down to the water drainage portion lower end 68, and the water droplet cannot climb up the gradually changing portion 66, of upward gradient, at the vehicle width direction inside. The water droplet therefore falls from the water drainage portion lower end 68 under its own weight. The water drainage portion 60 is provided further to the vehicle width direction outside than the wiper link 26 and the coupling portion 30 such that water droplets fall before reaching the upper sides of the wiper link 26 and the coupling portion 30. Water exposure due to water droplets falling from the upper end portion 54 of the molding 42 toward the wiper unit 22 can accordingly be suppressed.

The water drainage portion 60 is set such that the water drainage portion lower end 68 has a smaller vehicle width direction width than that of the water drainage portion upper end 62. In a case in which the width of the upper end of the water drainage portion 60 is narrow, water droplets may sometimes jump over the water drainage portion, thus it is preferable to set the width of the upper end of the water drainage portion 60 as wide as possible. However, the surface area of the join face 44A becomes smaller as the cutout portion becomes larger, such that the contact surface area between the join portion 44 and the inner face 20B of the lower end portion 20 of the windshield glass 14 becomes smaller. As a result, it is possible that the join strength decreases. In the present exemplary embodiment, a decrease in the join strength can be suppressed while maintaining the effect of making water droplets fall due to the vehicle width direction width of the water drainage portion lower end 68 being made smaller than that of the water drainage portion upper end 62.

The present exemplary embodiment includes the gradually changing portion 66 that gradually narrows in vehicle width direction width of the water drainage portion 60 from the water drainage portion upper end 62 toward the water drainage portion lower end 68, and the water drainage portion lower end 68 is configured as an angular shaped apex point. As described above, the effect of making water droplets fall increases as the width of the upper end of the water drainage portion 60 increases. However, when the cut out portion is large, the join strength between the inner face 20B of the lower end portion 20 of the windshield glass 14 and the join portion 44 decreases. Accordingly, the width of the water drainage portion upper end 62 is maximized, and the width of the water drainage portion lower end 68 is minimized, to form an efficient ape for achieving both the effect of making water droplets fall as well as securing the join strength.

The vehicle width direction width of the water drainage portion 60 is uniform at the part that is continuous from the water drainage portion upper end 62 in the depth direction. In the manufacturing process of the molding 42, when the molding 42 is cut to form the water drainage portion 60, sometimes there is variation in the depth of the cut. In a case in which the vehicle width direction width is not uniform at the water drainage portion upper end 62, or at a portion at the lower side thereof, the width of the water drainage portion 60 changes according to the depth of the cut, and there is a possibility that sufficient width cannot be secured to make water droplets fall. However, in the present exemplary embodiment, sufficient width can be secured to make water droplets fall, even when the cut is shallow, due to making the width uniform at the part that is continuous from the water drainage portion upper end 62 in the depth direction see FIG. 4C).

Moreover, the water drainage portion lower end 68 is a curved shape that is convex toward the vehicle up-down direction lower side. In a case in which the water drainage portion lower end 68 is not a curved shape, as illustrated by the dotted lines in FIG. 4B, the contact surface area between a water drainage portion lower end 68A and a water droplet 70A would be larger, and the water droplet 70A would become less liable to separate from the water drainage portion lower end 68A. Note that in the present exemplary embodiment, as illustrated by the solid lines in FIG. 4B, the water drainage portion lower end 68 has a curved shaped such that the contact surface area of the water droplet 70 to the water drainage portion lower end 68 is smaller and the water droplet 70 easily separates from the water drainage portion lower end 68 and falls. The water droplet 70 can thereby easily be made to fall from the water drainage portion 60.

Second Exemplary Embodiment

Explanation follows regarding a second exemplary embodiment of a windshield glass peripheral structure according to the present invention, with reference to FIG. 6. Note that configuration and operation that is basically the same as that of the first exemplary embodiment are appended with the same reference numerals as in the first exemplary embodiment, and sometimes explanation and illustration thereof is therefore omitted.

Figure 6A:
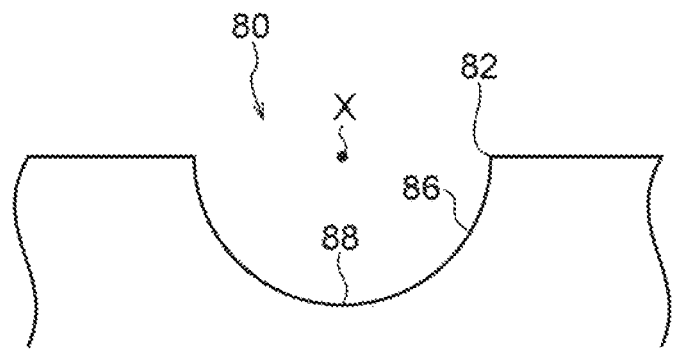
FIG. 6A is a plan view illustrating the vicinity of a water drainage portion of a molding applied with a windshield glass peripheral structure of a second exemplary embodiment.
Figure 6B:
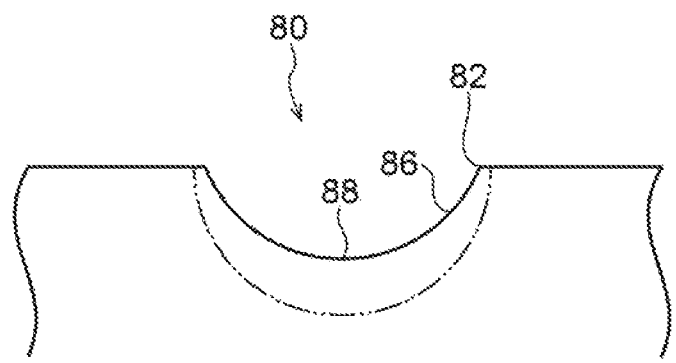
FIG. 6B is a plan view illustrating a water drainage portion in a case in which a shallow cut is made during processing to firm the water drainage portion.

As illustrated in FIG. 6A, the shape of a water drainage portion 80 of the present exemplary embodiment is a semicircular shape. This semicircular shape is a circle centered on a point X formed at the vehicle width direction center of a water drainage portion upper end 82. In the present exemplary embodiment, a gradually changing portion 86 is formed gradually narrowing in vehicle width direction width from the water drainage portion upper end 82 across to a water drainage portion lower end, and is set such that the vehicle width direction width is narrowest at a water drainage portion lower end 88. In the present exemplary embodiment, the change in the vehicle width direction width in the vicinity of the water drainage portion upper end 82 is small, and the change in the vehicle width direction width becomes larger on progression approaching the water drainage portion lower end 88.

In the present exemplary embodiment configured as described above, the water drainage portion 80 has a semicircular shape, and the change in the vehicle width direction width at the upper portion of the water drainage portion 80 is small, and change in the vehicle width direction width becomes larger on progression approaching the water drainage portion lower end 88. Accordingly, when cutting the molding and forming the water drainage portion, any fluctuation in the vehicle width direction width of the water drainage portion upper end 82 due to variance in the depth of the cut (see FIG. 6B) can be made small.

Third Exemplary Embodiment

Explanation follows regarding a third exemplary embodiment of the windshield glass peripheral structure according to the present invention, with reference to FIG. 7. Note that configuration and operation that is basically the same as that of the first exemplary embodiment are appended with the same reference numerals as in the first exemplary embodiment, and sometimes explanation and illustration thereof is therefore omitted.

As illustrated in FIG. 7, in the present exemplary embodiment, a first water drainage portion 60 is provided further to the vehicle width direction outside than a line segment B orthogonal to the molding 42 and passing through a point at the vehicle width direction outermost side of the wiper unit 22, and a second water drainage portion 90 is provided even further to the vehicle width direction outside than the first water drainage portion 60. The interval between the first water drainage portion 60 and the second water drainage portion 90 is from 20 mm to 30 mm.

In the present exemplary embodiment configured as described above, the second water drainage portion 90 is provided even further to the vehicle width direction outside than the first water drainage portion 60 such that the flow speed of water droplets at the second water drainage portion 90 at the vehicle width direction outside is decreased and water droplets can be made to fall at the first water drainage portion 60. Accordingly, even in a case in which the flow speed of water droplets is fast, the water droplets can be made to fall further to the vehicle width direction outside than the wiper unit 22, and water exposure of the per unit 22 can be suppressed.

Note that the present exemplary embodiment is configured by two water drainage portions. However, there is no limit thereto, and a greater plural number of water drainage portions may be provided. The effect of decreasing the flow speed of water droplets can be further enhanced by increasing the number of water drainage portions. Note that in cases in which the number of water drainage portions is increased, the vehicle width direction width of one of the water drainage portions can also be made smaller in order to achieve join strength as well. Moreover, the width or shape of the water drainage portions may be changed respectively.

Supplemental Explanation of the Exemplary Embodiments Above

It is conceivable that the shape of the water drainage portion may be various shapes other than those described hereto. For example, when applying the first exemplary embodiment, the water drainage portion lower end may be configured as a pentagonal shape and not as a curved shape. Configuration may also be made in which the water drainage portion is an inverted triangular shape including only the gradually changing portion, or a quadrangular shape including only the parallel portion. When applying the second exemplary embodiment, the circular shape of the water drainage portion may be configured as an ellipse, or may be an upper side or lower side of a circle centered at the water drainage portion upper end. Moreover, the water drainage portion may be configured without left-right symmetry.

In the present exemplary embodiment, the wiper unit is configured at the driving seat side. However, in cases in which the wiper unit is at the front passenger seat side, the water drainage portion may be provided to the molding at the front passenger seat side. Note that in configurations not encompassed by the present invention, a corresponding effect can be obtained even when applied to other components that have water exposure requirements such as an air intake duct of an air conditioner.

What is claimed is:

1. A windshield glass peripheral structure including a molding that couples a windshield glass with a cowl louver provided at a lower end side of the windshield glass, the molding comprising:
    an attachment portion that is attached to an inner side of an upper end portion of the cowl louver;
    an interposing portion that is interposed between and seals between a lower end portion of the windshield glass and an upper end portion of the cowl louver, and has a leading end at a vehicle outer side making contact with a lower edge portion of the windshield glass; and
    a joining portion that extends in a vehicle width direction following the lower end portion of the windshield glass, that is inclined toward a vehicle front and bottom on progression toward a vehicle width direction central portion, that includes a joining face joined to an inner face of the lower end portion of the windshield glass, and that is formed with a water drainage portion at which a vehicle up-down direction upper end portion of the joining face is cut out further toward a vehicle width direction outer side than a wiper unit provided at a vehicle up-down direction lower side of the cowl louver.

2. The windshield glass peripheral structure of claim 1, wherein the water drainage portion is formed such that a water drainage portion lower end is narrower in vehicle width direction width than a water drainage portion upper end.

3. The windshield glass peripheral structure of claim 2, wherein the water drainage portion:
    includes a gradually changing portion that gradually narrows in vehicle width direction width from the water drainage portion upper end side toward the water drainage portion lower end side; and is formed such that the water drainage portion lower end is narrowest in vehicle width direction width.

4. The windshield glass peripheral structure of claim 1, wherein a parallel portion having a uniform vehicle width direction width is formed at a part of the water drainage portion that is continuous in a depth direction from the water drainage portion upper end.

5. The windshield glass peripheral structure of claim 1, wherein the water drainage portion has a curved shape that is convex toward the vehicle up-down direction lower side.

6. The windshield class peripheral structure of claim 1, wherein at least one other water drainage portion is formed further to the vehicle width direction outer side than the water drainage portion.

7. The windshield glass peripheral structure of claim 1, wherein the water drainage portion is provided further to the vehicle width direction outer side than a line segment B orthogonal to the molding and passing through an end portion of a coupling portion forming the vehicle width direction outermost side of the wiper unit.

8. The windshield glass peripheral structure of claim 2, wherein:
   a dimensional ratio is 2:1 between the vehicle width direction width of the water drainage portion upper end and a depth of the water drainage portion; and
   a dimensional ratio is 1:2 between a depth of a parallel portion having a uniform vehicle width direction width at a part of the water drainage portion that is continuous in the depth direction from the water drainage portion upper end, and a depth of a gradually changing portion that gradually narrows in vehicle width direction width from the water drainage portion upper end side toward the water drainage portion lower end side.

* * * * *